United States Patent

Moreno

[15] 3,638,912
[45] Feb. 1, 1972

[54] TENSIONING DEVICE FOR GUY WIRES

[72] Inventor: Albert M. Moreno, 2601 Sea Island Dr., Fort Lauderdale, Fla. 33301

[22] Filed: May 25, 1970

[21] Appl. No.: 40,313

[52] U.S. Cl. .................................254/161, 248/161 R
[51] Int. Cl. .........................................B66f 13/00
[58] Field of Search ...........248/361 R, 361 A; 24/269, 71.2; 242/125.1, 125; 254/161

[56] References Cited

UNITED STATES PATENTS

| | | | |
|---|---|---|---|
| 3,416,763 | 12/1968 | Moreno | 248/361 |
| 938,388 | 10/1909 | Kerrigan | 242/125.1 |
| 1,767,938 | 6/1930 | Monnier | 242/117 |
| 1,559,574 | 11/1925 | McMillan | 254/161 |
| 2,584,099 | 1/1952 | Harkrader | 242/125.1 |

FOREIGN PATENTS OR APPLICATIONS 585,734  2/1947  Great Britain ..................242/125.1

Primary Examiner—Chancellor E. Harris
Attorney—Erwin A. Yaeger

[57] ABSTRACT

A tensioning device for guy wires, cables and the like consisting of a substantially U-shaped bracket holding a spindle or bolt which is both rotatively and axially movable in the legs of the bracket. A nonround or square opening in one of the legs of the bracket normally engages a complementary nonround or square part of the spindle and prevents the spindle from normally turning. The spindle or bolt, when axially and manually moved, causes the nonround portion of it to be shifted out of the nonround opening in the bracket and the spindle can then be turned to wind up the guy wire upon it to the extent necessary to bring the wire to the required tension. A bracket mounted on the spindle carries a screw which engages the bracket and causes the same to clampingly hold the wire attached to the spindle or bolt.

3 Claims, 6 Drawing Figures

PATENTED FEB 1 1972 3,638,912

INVENTOR
Albert M. Moreno
BY
ATTORNEY

TENSIONING DEVICE FOR GUY WIRES

This invention relates to a tension and fastening device for guy wires or other elements such as ropes, straps and fastening-down devices and which are required to be maintained under tension when in their operative or holding positions. Most of the cable or guy wire tensioning devices in use today require two men for their manipulation. A feature of the present invention resides in the provision of a guy wire or cable tensioning device which can be easily operated by one man; which is of relatively simple and sturdy construction and which has numerous advantages apparent to those skilled in this art.

In the accompany drawing, wherein an illustrative embodiment of the invention is disclosed:

Figure 1:
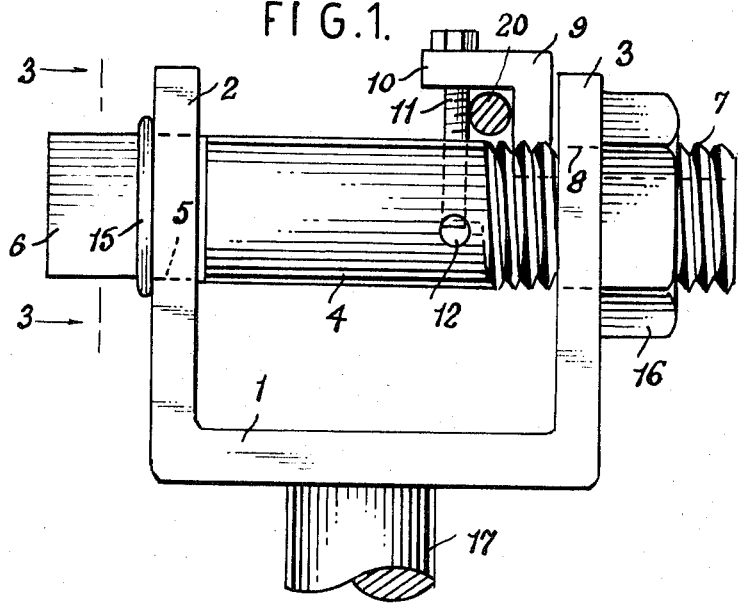
FIG. 1 is a side elevational view of a guy wire or cable tensioning device constructed in accordance with the invention.
Figure 2:
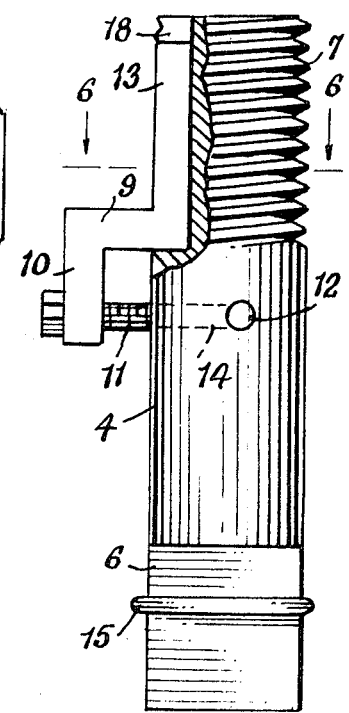
FIG. 2 is a view of the takeup spindle with a portion of the same shown in section.
Figure 3:
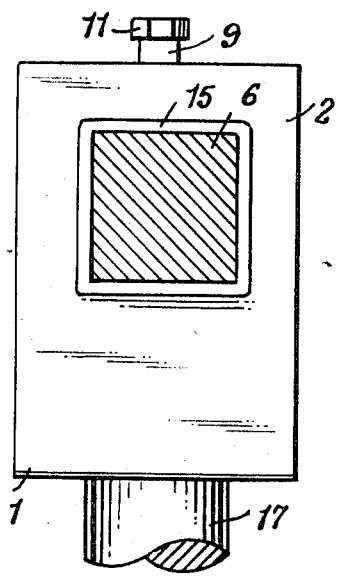
FIG. 3 is a sectional view, taken substantially on the line 3—3, looking in the direction of the arrows.
Figure 4:
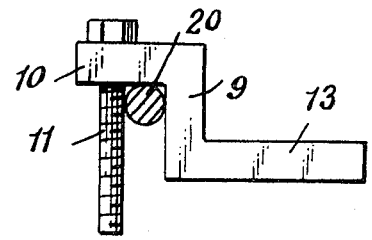
FIG. 4 is a side elevational view of the bracket which carries the wire-clamping setscrew.
Figure 5:
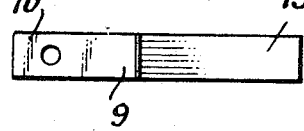
FIG. 5 is a top plan view of that bracket.
Figure 6:
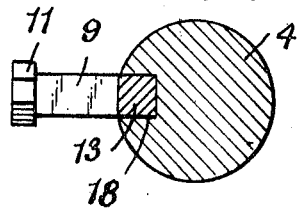
FIG. 6 is a sectional view, taken substantially on the line 6—6 of FIG. 2, looking in the direction of the arrows.

The main bracket or body member of the device is shown at 1 in the drawing, the same consisting of a sturdy substantially U-shaped bracket having spaced legs shown respectively at 2 and 3. Mounted for rotative as well as for longitudinal movement in these legs is a takeup spindle in the form of a bolt that is provided with a square or nonround portion 6 of one end adapted to normally fit within a complementary or square opening 5 provided in the leg 2 of the bracket 1. The spindle or bolt 4 has an opposite end portion threaded as shown at 7 and the remainder of the spindle is circular in cross-sectional shape. It will be apparent that when the square part 6 of the spindle 4 is positioned in the square opening 5 of the bracket, the spindle will be held against rotative movement.

An opening 8 extending through the leg 3 of the bracket 1 is circular in shape so that the spindle can be slid longitudinally through it when required. The spindle or bolt may be made in any desired length. The square portion 6 of the spindle has a suitably positioned flange or bead 15 which acts to limit the axial movement of the spindle in one direction or toward the right as viewed in FIG. 1.

In the drawing the wire 20 is shown loosely fitted between the leg 10 and the spindle, but when the screw is tightened the arm 10 will clamp the wire between it and the periphery of the spindle.

At 9 is shown a bracket which may be said to be roughly Z-shaped, the same thus having leg 13 that is loosely fitted in a groove 18 formed in and disposed longitudinally of the spindle 4 and extending through the threaded area thereof. A second leg 10 of the bracket 9 threadably receives a setscrew 11 which is threadable downwardly into the recess in the body of the spindle so as to bring the leg 10 of the bracket against the wire and cause it to clampingly engage the guy wire that is to be tensioned. It will be noted that the wire 20 is thus confined in the space between the screw 11 and the leg 10 of the bracket. The threaded portion 7 of the spindle 4 receives a nut shown at 16 which is received on the spindle on the outside of the leg 3.

As an alternative, a hole 12 may be provided through the spindle 4 and the wire might be extended through such hole and clamped by the screw 11.

From the foregoing, the operation of the device will be readily understood. The wire or cable to be tensioned is held as indicated in FIG. 1 or by insertion through hole 12, and by the adjustment of the setscrew 11 the wire will be clamped and held against displacement. To wind the wire upon the takeup member or spindle 4, the spindle is shifted to the left as viewed in FIG. 1 until the square end 6 thereof is displaced out of the square opening 5 in the bracket leg 2. The circular portion of the takeup member or spindle being then positioned in the opening 5, and the square portion 6 of the spindle being engaged by a suitable tool to enable the spindle to be rotated, and the wire engaged by the spindle will be wound around the spindle to the extent required to apply the required tension to the wire. The axial and rotative movement of the spindle takes place while the nut 16 is either removed or loosened to permit the required axial shift of the spindle before rotating it. By tightening the nut 16, the spindle 4 will be drawn axially toward the right to bring the square portion 6 thereof into the square opening 5 to thereby hold the spindle 4 against turning movement and retain the guy wire under the required tension.

The element shown at 17 is a part of a rod or post which is attached to the bracket 1 and can be used as an anchoring device in the ground to mount the device or it may be otherwise attached to any other firm support.

What I claim is:

1. A device for tensioning guy wires, cables and the like comprising, a substantially U-shaped bracket having spaced legs, a wire takeup spindle mounted for rotative and limited axial shift in the legs of the bracket, one of the legs having a square opening at one end of the spindle, said end of the spindle having a square portion fitting in said square opening, the opposite end of the spindle being threaded and extending through a round opening in the second leg of the bracket, a nut threadable on the thread end of the spindle on the outer side of the latter leg, the spindle having an axial groove at the threaded end of it, a substantially Z-shaped bracket having a leg loosely disposed in said groove, said bracket having a second leg disposed at a distance from the periphery of the spindle, the two legs being joined by an integral connection piece disposed at right angles to the legs, the second leg carrying a screw threadably adjustable into the spindle, said screw being spaced from the connection piece for a distance sufficient to enable an end portion of a guy wire or cable to be inserted between the connection piece and the screw, a tightening of the screw being effective to clampingly hold the second leg of the bracket against the guy wire or cable while the said wire or cable is positioned between the screw and the connection piece.

2. A tensioning device for guy wires according to claim 1, wherein the screw holds the bracket against axial shift relatively to the spindle while also holding the bracket under clamping pressure on the guy wire.

3. A tensioning device for guy wires and the like comprising, a substantially U-shaped frame, a spindle mounted for rotative adjustment in said frame, said spindle being axially shiftable to lock it against rotative movement, the spindle having an axial groove adjacent to one end, a substantially Z-shaped bracket having a first leg loosely accommodated in said groove, a second leg on the bracket being spaced from the periphery of the spindle to permit a part of a guy wire to be inserted between it and the surface of the spindle, a screw extending through the second leg of the bracket and situated to one side of the guy wire when said guy wire extends between said second leg and the surface of the spindle, the screw being effective to clampingly hold the second leg of the bracket against the guy wire, and said screw being also effective to hold the bracket from axial shift relatively to the spindle.

* * * * *